(12) United States Patent
Suenaga et al.

(10) Patent No.: US 10,787,134 B2
(45) Date of Patent: Sep. 29, 2020

(54) GROMMET

(71) Applicant: SUMITOMO WIRING SYSTEMS, LTD., Mie (JP)

(72) Inventors: Ryo Suenaga, Mie (JP); Gousei Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 151 days.

(21) Appl. No.: 16/076,174

(22) PCT Filed: Mar. 2, 2017

(86) PCT No.: PCT/JP2017/008232
§ 371 (c)(1),
(2) Date: Aug. 7, 2018

(87) PCT Pub. No.: WO2017/159376
PCT Pub. Date: Sep. 21, 2017

(65) Prior Publication Data
US 2019/0351849 A1   Nov. 21, 2019

(30) Foreign Application Priority Data

Mar. 18, 2016   (JP) .................................. 2016-055273

(51) Int. Cl.
*H02G 3/22* (2006.01)
*B60R 16/02* (2006.01)
(52) U.S. Cl.
CPC .......... *B60R 16/0222* (2013.01); *H02G 3/22* (2013.01)
(58) Field of Classification Search
CPC .......... H02G 3/04; H02G 3/0468; H02G 3/22; H02G 3/30; H02G 3/36; H02G 3/0406;
(Continued)

(56) References Cited

U.S. PATENT DOCUMENTS 6,897,380 B2 *   5/2005   Sakata ................ B60R 16/0222
                                                     16/2.1
8,299,364 B2 *  10/2012   Suzuki ................ B60R 16/0222
                                                     16/2.1
(Continued)

FOREIGN PATENT DOCUMENTS

JP        2009-296737       12/2009
JP        2012-100396        5/2012

OTHER PUBLICATIONS

Official Communication issued in International Bureau of WIPO Patent Application No. PCT/JP2017/008232, dated Apr. 4, 2017.

*Primary Examiner* — Angel R Estrada
(74) *Attorney, Agent, or Firm* — Greenblum & Bernstein, P.L.C.

(57) ABSTRACT

A grommet is provided with a small-diameter tubular portion that is fixated to an outer circumferential surface of a wire harness, a large-diameter tubular portion that is fixated to a through-hole of a fixed member, and an increasing-diameter tubular portion that connects the small-diameter tubular portion and the large-diameter tubular portion. The increasing-diameter tubular portion includes a small-diameter tubular portion-side end portion provided isolated from the small-diameter tubular portion on the outer circumference side of the small-diameter tubular portion, and a flexible connecting portion connecting an inner circumferential surface of the increasing-diameter tubular portion to the small-diameter tubular portion. A plurality of contact ribs are provided projecting from an outer circumferential surface of the increasing-diameter tubular portion, the contact ribs being arranged so as to be separated from each other in a circumference direction, each extending from the large-diameter tubular portion side toward the small-diameter tubular portion-side end portion.

6 Claims, 3 Drawing Sheets

(58) Field of Classification Search
CPC . H02G 3/24; H02G 3/26; B60R 16/02; B60R 16/0222; B60R 16/0207; B60R 16/0215; H01B 17/58; H01B 17/583; H01B 17/586; F16L 5/02; F16L 5/00
USPC .... 174/650, 152 R, 152 G, 153 G, 135, 142, 174/137 R, 151, 17 CT, 138 R; 439/587, 439/271, 272, 273, 274, 275; 16/2.1, 2.2; 248/56

See application file for complete search history.

(56) References Cited

U.S. PATENT DOCUMENTS

| | | | |
|---|---|---|---|
| 8,546,695 B2* | 10/2013 | Okuhara | B60R 16/0222 16/2.1 |
| 8,981,228 B2* | 3/2015 | Okuhara | B60R 16/0222 174/152 G |
| 9,673,600 B2* | 6/2017 | Okuhara | H02G 3/22 |
| 10,192,657 B2* | 1/2019 | Ujita | B60R 16/0207 |
| 10,396,489 B2* | 8/2019 | Mizuno | H02G 3/22 |
| 2011/0073351 A1 | 3/2011 | Okuhara et al. | |
| 2015/0263495 A1 | 9/2015 | Suenaga | |

* cited by examiner

GROMMET

FIELD OF THE INVENTION

The present invention relates to a grommet that is mounted in a through-hole formed in a fixed member, such as a vehicle body panel, such that the grommet is mounted around the exterior of a wire harness.

BACKGROUND OF THE INVENTION

Conventionally, in cases where a wire harness routed in an automobile is routed so as to traverse a fixed member such as a vehicle body panel that separates a vehicle cabin exterior (such as an engine compartment) from a vehicle cabin interior, a grommet that is mounted around the exterior of the wire harness is attached to a through-hole formed in the vehicle body panel. The grommet has a structure that is integrally provided with a small-diameter tubular portion that is snugly fixated to an outer circumferential surface of the wire harness, a large-diameter tubular portion that is snugly engaged and fixated to the through-hole of the vehicle body panel, and an increasing-diameter tubular portion that connects the two. The grommet is configured to prevent water from entering the vehicle cabin interior from the vehicle cabin exterior through the through-hole, for example.

In this regard, when a grommet of this kind is snugly engaged and fixated to the through-hole of the vehicle body panel, first the small-diameter tubular portion side of the grommet is inserted through the through-hole, then the increasing-diameter tubular portion is slid into the through-hole while undergoing compression deformation and is passed through the through-hole. When a circumferential edge portion of the through-hole reaches an annular groove provided in the large-diameter tubular portion, the increasing-diameter tubular portion elastically reverts and the circumferential edge portion of the through-hole is snugly engaged and fixated to the annular groove of the large-diameter tubular portion. Accordingly, the grommet is positioned so as to not detach from the through-hole of the vehicle body panel.

The work of sliding the increasing-diameter tubular portion into the through-hole and inducing compression deformation in this way to insert the grommet into the through-hole requires a significant insertion force. In view of this, Japanese Utility Model Publication No. H1-68625 (Patent Literature 1) proposes a structure that reduces the insertion force by providing ribs that project from an outer circumferential surface of an increasing-diameter tubular portion, the ribs extending from the large-diameter tubular portion across a small-diameter tubular portion and provided at positions separated from each other in a circumference direction of the increasing-diameter tubular portion, reducing the surface area of the increasing-diameter tubular portion in contact with the through-hole, which reduces the insertion force.

In this regard, when a plurality of ribs that extend from the large-diameter tubular portion across the small-diameter tubular portion are provided projecting from the increasing-diameter tubular portion, the insertion force is indeed reduced, yet there is a problem inherent to this configuration in that the holding power of the grommet after being mounted is reduced. In other words, when the grommet has been mounted to the through-hole and the wire harness is pulled toward the large-diameter tubular portion with an excessive force, the small-diameter tubular portion of the grommet is pulled and deformed toward the large-diameter tubular portion, and the increasing-diameter tubular portion may also deform to collapse toward the inner circumference along with the ribs that are connected to the small-diameter tubular portion, and the annular groove of the large-diameter tubular portion may slip off the circumferential edge portion of the through-hole.

RELATED ART

Patent Literature

Patent Literature 1: Japanese Utility Model Publication No. H1-68625

SUMMARY OF THE INVENTION

Problems to be Solved by the Invention

The present invention has been devised against the background of the above-described situation and provides as a solution a grommet having a novel structure that is capable of achieving both a reduction in force used to insert the grommet into a through-hole and an improvement in holding power on the through-hole.

Means for Solving the Problems

A first aspect of the present invention is a grommet provided with a small-diameter tubular portion that is fixated to an outer circumferential surface of a wire harness, a large-diameter tubular portion that is fixated to a through-hole of a fixed member, and an increasing-diameter tubular portion that connects the small-diameter tubular portion and the large-diameter tubular portion. The increasing-diameter tubular portion includes a small-diameter tubular portion-side end portion provided isolated from the small-diameter tubular portion on the outer circumference side of the small-diameter tubular portion, and a flexible connecting portion connecting an inner circumferential surface of the increasing-diameter tubular portion to the small-diameter tubular portion. A plurality of contact ribs are provided projecting from an outer circumferential surface of the increasing-diameter tubular portion, the contact ribs being arranged so as to be separated from each other in a circumference direction, each extending from the large-diameter tubular portion side toward the small-diameter tubular portion-side end portion.

According to this aspect, because the plurality of contact ribs are provided projecting from the outer circumferential surface of the increasing-diameter tubular portion, the surface area of the increasing-diameter tubular portion that makes contact when inserted through the through-hole can be reduced, reducing the insertion force. Moreover, in the grommet according to this aspect, the small-diameter tubular portion-side end portion of the increasing-diameter tubular portion is provided isolated from the small-diameter tubular portion on the outer circumference side of the small-diameter tubular portion, and the small-diameter tubular portion-side end portion is connected to the small-diameter tubular portion via the flexible connecting portion on the inner circumferential surface side. This avoids connecting the contact ribs directly to the small-diameter tubular portion. Accordingly, after the grommet is mounted to the through-hole, even when the wire harness is pulled toward the large-diameter tubular portion with an excessive force, the grommet can avoid the pulling force that is transferred to the small-diameter tubular portion being transferred directly to the contact ribs, and can avoid deformation in which the increasing-diameter tubular portion collapses toward the inner circumference, which was a difficulty with conventional structures, and the holding power of the grommet can likewise be improved.

Additionally, the small-diameter tubular portion-side end portion of the increasing-diameter tubular portion is provided isolated from the small-diameter tubular portion on the outer circumference side of the small-diameter tubular portion, and the inner circumferential surface of the increasing-diameter tubular portion is connected to the small-diameter tubular portion via the flexible connecting portion. Therefore, when inserting the grommet into the through-hole, compression deformation of the increasing-diameter tubular portion can be all the more readily achieved. Also, after the grommet is mounted, when the small-diameter tubular portion is pulled toward the large-diameter tubular portion, the flexible connecting portion can absorb such pulling forces and the grommet can advantageously avoid having the pulling force affect the increasing-diameter tubular portion, and can further improve the holding strength of the grommet.

A second aspect of the present invention is the grommet according to the first aspect, in which each contact rib is provided right up to an end face of the small-diameter tubular portion-side end portion, and the contact ribs configure a flared portion that flares outward in a diameter direction at the end face of the small-diameter tubular portion-side end portion.

According to this aspect, the flared portion configured by the end faces of the contact ribs can improve the rigidity of the small-diameter tubular portion-side end portion of the increasing-diameter tubular portion. Therefore, deformation in which the increasing-diameter tubular portion collapses toward the inner circumference can be all the more advantageously prevented, and still further improvement of the holding power can be achieved.

A third aspect of the present invention is the grommet according to the second aspect, in which a width-direction center portion of each contact rib is provided with an excavated hole that is open on an outer circumferential surface, and the excavated hole does not extend all the way to the flared portion.

According to this aspect, by providing the excavated hole at the width-direction center portion of each contact rib, the surface area that makes contact with the through-hole can be further reduced and the insertion force can be still further reduced. Moreover, because the excavated hole does not extend all the way to the flared portion, the rigidity of the small-diameter tubular portion-side end portion of the increasing-diameter tubular portion can be ensured, deformation in which the increasing-diameter tubular portion collapses inward can be prevented, and the holding power of the grommet can be guaranteed.

A fourth aspect of the present invention is the grommet according to any one of the first through third aspects, in which a connecting position of the flexible connecting portion on the inner circumferential surface of the increasing-diameter tubular portion is a position that is shifted closer to the large-diameter tubular portion than the small-diameter tubular portion-side end portion.

According to this aspect, after the grommet is inserted through the through-hole, when the small-diameter tubular portion is pulled toward the large-diameter tubular portion, the pulling force affects the large-diameter tubular portion before affecting the small-diameter tubular portion-side end portion of the increasing-diameter tubular portion, and therefore the small-diameter tubular portion-side end portion makes contact with the small-diameter tubular portion and the wire harness without collapsing inward. As a result, the inner circumferential surface of the small-diameter tubular portion-side end portion of the increasing-diameter tubular portion makes contact with the small-diameter tubular portion and wire harness over a broad contact area, and greater deformation of the increasing-diameter tubular portion can be advantageously prevented. Therefore, the holding power of the grommet can be all the more advantageously ensured.

Effect of the Invention

According to the present invention, because the plurality of contact ribs are provided projecting from the outer circumferential surface of the increasing-diameter tubular portion, the surface area of the increasing-diameter tubular portion that makes contact when inserted through the through-hole can be reduced, reducing the insertion force. Moreover, because the small-diameter tubular portion-side end portion of the increasing-diameter tubular portion is provided isolated from the small-diameter tubular portion on the outer circumference side of the small-diameter tubular portion, the grommet avoids connecting the contact ribs directly to the small-diameter tubular portion. Accordingly, after the grommet is mounted to the through-hole, even when the wire harness is pulled toward the large-diameter tubular portion with an excessive force, the grommet can avoid the pulling force that is transferred to the small-diameter tubular portion being transferred directly to the contact ribs, and can avoid deformation in which the increasing-diameter tubular portion collapses toward the inner circumference, which was a difficulty with conventional structures, and the holding power of the grommet can likewise be improved. Additionally, the inner circumferential surface of the increasing-diameter tubular portion is connected to the small-diameter tubular portion via the flexible connecting portion, and therefore when inserting the grommet into the through-hole, compression deformation of the increasing-diameter tubular portion can be all the more readily achieved. Also, after the grommet is mounted, when the small-diameter tubular portion is pulled toward the large-diameter tubular portion, the flexible connecting portion can absorb such pulling forces and the grommet can advantageously avoid having the pulling force affect the increasing-diameter tubular portion, and can further improve the holding strength of the grommet.

MODE FOR CARRYING OUT THE INVENTION

In the following, an embodiment of the present invention is described with reference to the drawings.

Figure 1:
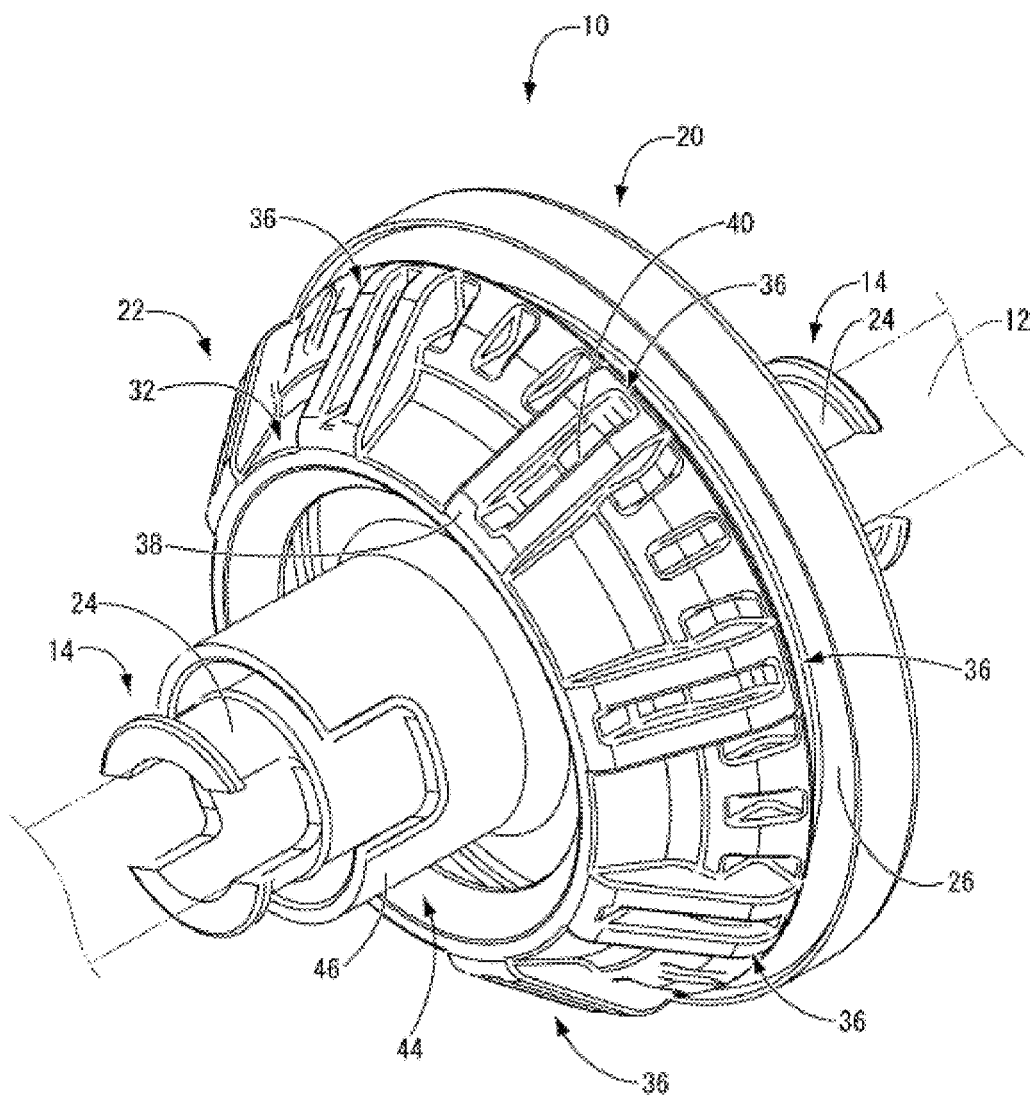
FIG. 1 is a perspective view illustrating a state where a grommet (one embodiment of the present invention) is mounted around the exterior of a wire harness.
Figure 2:
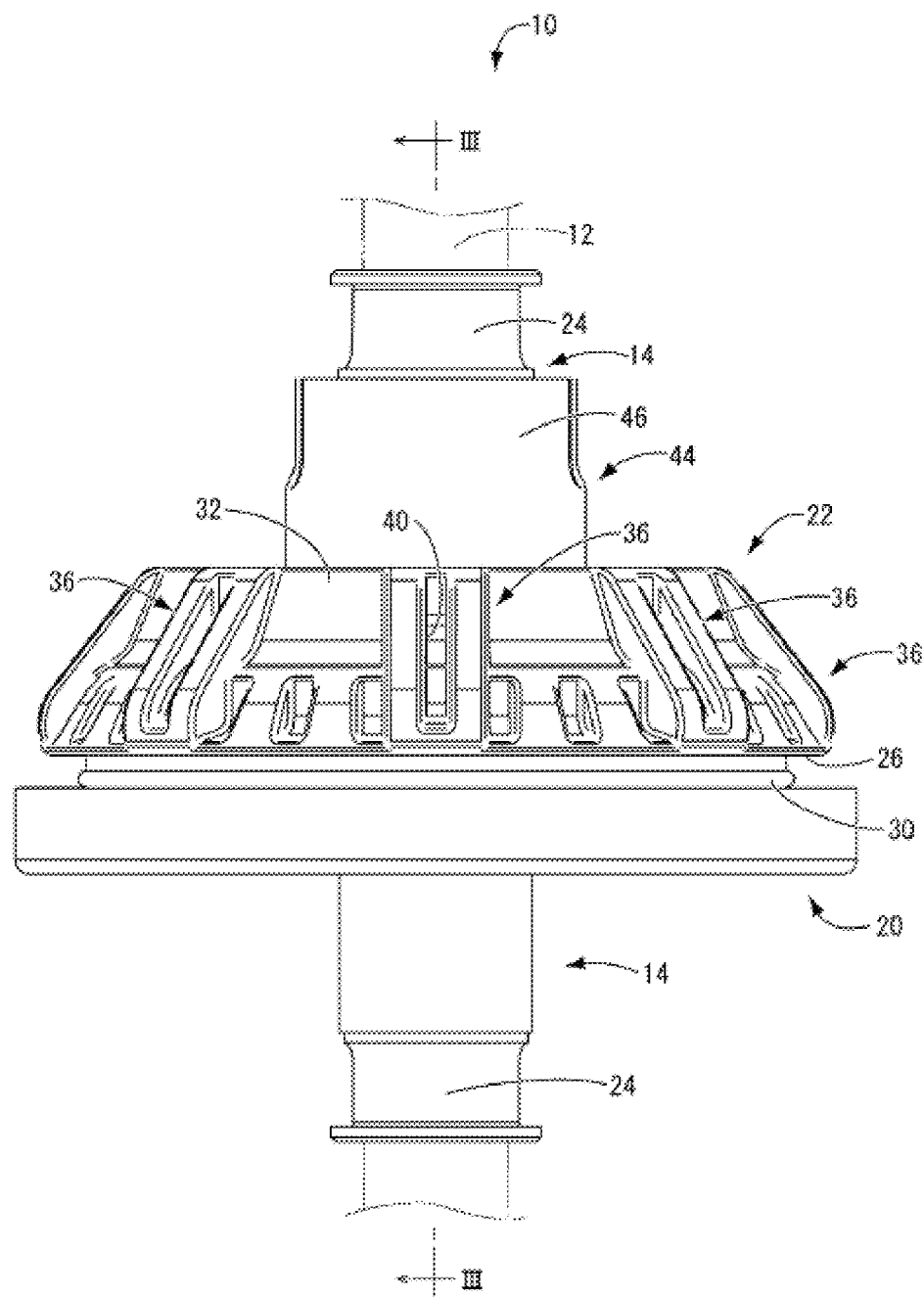
FIG. 2 is a front view of FIG. 1.
Figure 3:
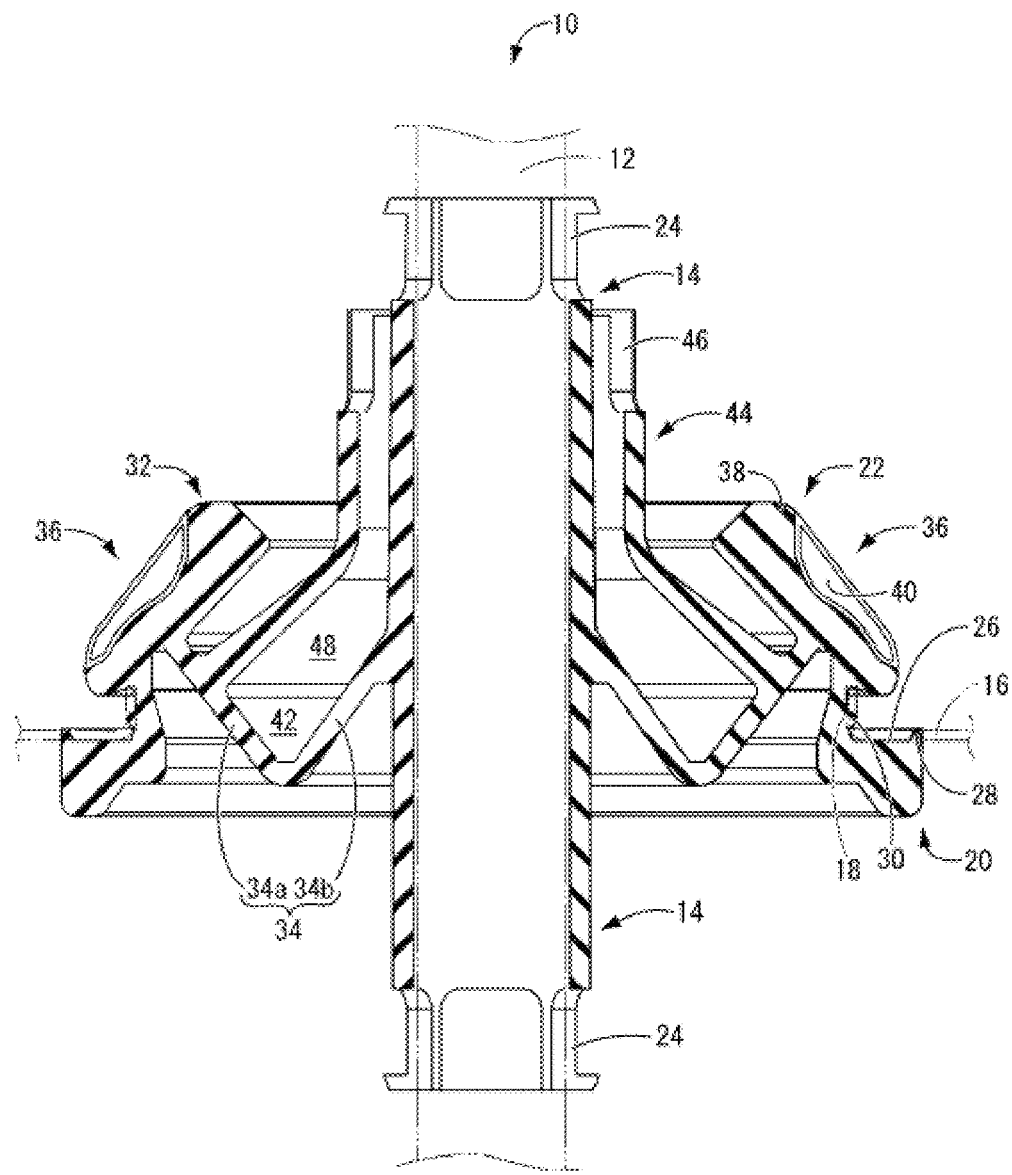
FIG. 3 is a cross-sectional view along in FIG. 2, and illustrates a state where the grommet is fixated to a fixed member.

FIGS. 1 to 3 illustrate a state where a grommet 10 (one embodiment of the present invention) is mounted around the exterior of a wire harness 12. The grommet 10 is configured to include a small-diameter tubular portion 14 extending in an axis direction (in FIG. 3, the up/down direction) in substantially a cylindrical shape; a thick-walled large-diameter tubular portion 20 positioned at one side of the axis direction (in FIG. 3, the downward side) and engaging with a through-hole 18 formed in vehicle body panel 16 (fixed member); and a dome-shaped increasing-diameter tubular portion 22 increasing in diameter and extending from the other side of the axis direction (in FIG. 3, upward side) toward the large-diameter tubular portion 20, linking the small-diameter tubular portion 14 and the large-diameter tubular portion 20. The grommet 10 is integrally formed of a rubber material such as EPDM (ethylene propylene rubber), CR (chloroprene rubber), or SI (silicone rubber). In the description that follows, "up" refers to up in FIGS. 2 and 3 while "down" refers to down in FIGS. 2 and 3. Also, to facilitate understanding, the wire harness 12 is depicted with imaginary lines in FIGS. 1 to 3.

As illustrated in FIG. 3, the small-diameter tubular portion 14 is configured to extend along substantially the full length of the axis direction (up/down direction in FIG. 3) of the grommet 10, and a tape fixation portion 24 is formed at both axis direction ends. The tape fixation portions 24 have a shape in which an opening end thereof is provided with substantially rectangular notches in a circumferential wall at positions opposite each other in a diameter direction, as illustrated in FIG. 1. This enables the tape fixation portion 24 to elastically deform inward in the diameter direction. Therefore, by winding binding tape (not shown in the drawings) around an outer circumference of the tape fixation portion 24, the diameter of the tape fixation portion 24 is reduced and the small-diameter tubular portion 14 can be fixated to the outer circumferential surface of the wire harness 12.

Meanwhile, as illustrated in FIGS. 1 to 3, the large-diameter tubular portion 20 is provided with an annular groove 26 having substantially a rectangular shape in cross-section, the annular groove 26 extending around the entire circumference direction of the outer circumferential surface of the large-diameter tubular portion 20. A lower side surface rib 28 (see FIG. 3) that extends annularly around the entire circumference of the annular groove 26 is provided at an opening end on a lower side surface of the annular groove 26, whereas a bottom surface rib 30 (see FIGS. 2 and 3) that extends annularly around the entire circumference of the annular groove 26 is provided to a bottom surface of the annular groove 26. Then, an inner edge portion of a circular through-hole 18 formed in the vehicle body panel 16 enters and engages with the annular groove 26, whereby the grommet 10 according to the present embodiment is fixated to the vehicle body panel 16. As a result, as illustrated in FIG. 3, a gap between the annular groove 26 and the through-hole 18 of the vehicle body panel 16 can be reliably eliminated by the lower side surface rib 28 and the bottom surface rib 30. This reliably prevents debris, water, or the like from entering through the gap between the annular groove 26 and the through-hole 18 of the vehicle body panel 16. In order to facilitate understanding, the vehicle body panel 16 is depicted with imaginary lines in FIG. 3.

As illustrated in FIG. 3, the increasing-diameter tubular portion 22 is configured to include a small-diameter tubular portion-side end portion 32, which is provided isolated from the small-diameter tubular portion 14 on the outer circumference side of the small-diameter tubular portion 14, and a flexible connecting portion 34 having substantially a V-shaped cross-section in a front view, the flexible connecting portion 34 connecting an inner circumferential surface of the increasing-diameter tubular portion 22 to the small-diameter tubular portion 14. In addition, as illustrated in FIGS. 1 and 2, a plurality of contact ribs 36 (in the present embodiment, eight) are arranged projecting from the outer circumferential surface of the increasing-diameter tubular portion 22. The contact ribs 36 have a substantially rectangular shape in a front view and are arranged so as to be separated from each other in the circumference direction, each extending from the large-diameter tubular portion 20 side toward the small-diameter tubular portion-side end portion 32. The contact ribs 36 are provided right up to an end face of the small-diameter tubular portion-side end portion 32, and the contact ribs 36 configure a flared portion 38 that flares outward in the diameter direction at the end face of the small-diameter tubular portion-side end portion 32. Furthermore, a width-direction center portion of each contact rib 36 is provided with an excavated hole 40 that is open on the outer circumferential surface, the excavated hole 40 having substantially a rectangular shape in a front view. The excavated hole 40 is configured to not extend all the way to the flared portion 38.

As illustrated in FIG. 3, the flexible connecting portion 34 has a connecting position on the inner circumferential surface of the increasing-diameter tubular portion 22 that constitutes a position that is shifted closer to the large-diameter tubular portion 20 than the small-diameter tubular portion-side end portion 32. Also, a middle region 42 that occupies a space between an increasing-diameter tubular portion-side connecting portion 34*a* and a small-diameter tubular portion-side connecting portion 34*b* (the portions configuring the flexible connecting portion 34) is formed by flexing in a peak shape toward the large-diameter tubular portion 20. Moreover, a middle tubular portion 44 is formed on the increasing-diameter tubular portion-side connecting portion 34*a* of the flexible connecting portion 34, the middle tubular portion 44 extending substantially parallel to the small-diameter tubular portion-side connecting portion 34*b* of the flexible connecting portion 34, then extending toward the other side of the axis direction (up, in FIG. 3) to a position that does not reach the tape fixation portion 24 of the small-diameter tubular portion 14, the middle tubular portion 44 extending in a substantially cylindrical shape that is coaxial with, and has a larger diameter than, the small-diameter tubular portion 14. A tape fixation portion 46 is formed on an extended end portion of the middle tubular portion 44. The tape fixation portion 46 has a shape in which an opening end thereof is provided with substantially rectangular notches in a circumferential wall at positions opposite each other in the diameter direction, as illustrated in FIG. 1. This enables the tape fixation portion 46 to elastically deform inward in the diameter direction. Therefore, by winding binding tape (not shown in the drawings) around an outer circumference of the tape fixation portion 46, the diameter of the tape fixation portion 46 is reduced and the middle tubular portion 44 can be fixated to the outer circumferential surface of the small-diameter tubular portion 14. This forms a sound-proofing sealed chamber 48, enclosed by the middle tubular portion 44, the small-diameter tubular portion 14, and the flexible connecting portion 34.

According to the grommet 10 having this configuration, the plurality of contact ribs 36 (in the present embodiment, eight) are arranged projecting from the outer circumferential surface of the increasing-diameter tubular portion 22, and are arranged so as to be separated from each other in the circumference direction. Thus, when the grommet 10 is mounted to the vehicle body panel 16, the surface area of the outer circumferential surface of the increasing-diameter tubular portion 22 that makes contact with the through-hole 18 of the vehicle body panel 16 can be reduced, and therefore the force used to insert the grommet 10 into the vehicle body panel 16 can be reduced. The small-diameter tubular portion-side end portion 32 of the increasing-diameter tubular portion 22 is provided isolated from the small-diameter tubular portion 14 on the outer circumference side of the small-diameter tubular portion 14. Thus, after the grommet 10 is mounted to the through-hole 18 of the vehicle body panel 16, even when the wire harness 12 is pulled with excessive force toward the large-diameter tubular portion 20, the present embodiment avoids having the contact ribs 36 directly connected to the small-diameter tubular portion 14, and therefore the present embodiment avoids the pulling force that is transferred to the small-diameter tubular portion 14 from the wire harness 12 being transferred directly to the contact ribs 36. Therefore, because the present embodiment avoids deformation in which the increasing-diameter tubular portion 22 collapses toward the inner circumference, which was a difficulty with conventional structures, the holding power of the grommet 10 can likewise be improved.

Furthermore, the inner circumferential surface of the increasing-diameter tubular portion 22 is connected to the small-diameter tubular portion 14 via the flexible connecting portion 34. Accordingly, when the grommet 10 is inserted and mounted to the through-hole 18 of the vehicle body panel 16, the flexible connecting portion 34 elastically deforms inward in the diameter direction of the grommet 10, thereby enabling compression deformation of the increasing-diameter tubular portion 22 to be all the more readily accomplished. Moreover, after the grommet 10 is mounted, even when the small-diameter tubular portion 14 is pulled toward the large-diameter tubular portion 20 with excessive force, the flexible connecting portion 34 can absorb such pulling forces by elastically deforming toward the large-diameter tubular portion 20, and the present embodiment can advantageously avoid having the pulling force affect the increasing-diameter tubular portion 22, and can therefore further improve the holding strength of the grommet 10. Additionally, the flexible connecting portion 34 has the connecting position on the inner circumferential surface of the increasing-diameter tubular portion 22 that constitutes a position that is shifted closer to the large-diameter tubular portion 20 than the small-diameter tubular portion-side end portion 32. Accordingly, after the grommet 10 is mounted, even when the small-diameter tubular portion 14 is pulled toward the large-diameter tubular portion 20 with excessive force, the pulling force affects the large-diameter tubular portion 20 before affecting the small-diameter tubular portion-side end portion 32 of the increasing-diameter tubular portion 22, and therefore the small-diameter tubular portion-side end portion 32 will not collapse inward. Therefore, because the inner circumferential surface of the small-diameter tubular portion-side end portion 32 of the increasing-diameter tubular portion 22 has a broad contact area to either directly or indirectly make contact with the middle tubular portion 44, the small-diameter tubular portion 14, and the wire harness 12, and greater deformation of the increasing-diameter tubular portion 22 can be advantageously prevented, the holding power of the grommet 10 can be all the more advantageously ensured.

The contact ribs 36 are provided right up to the end face of the small-diameter tubular portion-side end portion 32, and the contact ribs 36 configure the flared portion 38 that flares outward in the diameter direction at the end face of the small-diameter tubular portion-side end portion 32. Accordingly, the rigidity of the small-diameter tubular portion-side end portion 32 of the increasing-diameter tubular portion 22 can be improved. Therefore, deformation in which the increasing-diameter tubular portion 22 collapses toward the inner circumference can be all the more advantageously prevented, and still further improvement of the holding power of the grommet 10 can be achieved. Furthermore, the width-direction center portion of each contact rib 36 is configured to open on the outer circumferential surface thereof into the excavated hole 40. Accordingly, because the surface area that makes contact with the through-hole 18 of the vehicle body panel 16 can be reduced, the force used to insert the grommet 10 into the vehicle body panel 16 can be still further reduced. Moreover, because the excavated hole 40 is configured so as to not extend all the way to the flared portion 38, the rigidity of the small-diameter tubular portion-side end portion 32 of the increasing-diameter tubular portion 22 is ensured. Therefore, deformation in which the increasing-diameter tubular portion 22 collapses inward can be prevented and the holding power of the grommet 10 can be guaranteed.

Additionally, the middle region 42 that occupies a space between the increasing-diameter tubular portion-side connecting portion 34a and the small-diameter tubular portion-side connecting portion 34b (the portions configuring the flexible connecting portion 34) is formed by flexing in a peak shape toward the large-diameter tubular portion 20. Thus, even when the wire harness 12 is pulled with excessive force toward the large-diameter tubular portion 20, because the middle region 42 flexes in this way and elastically deforms toward the large-diameter tubular portion 20, the present embodiment avoids the pulling force that is transferred to the small-diameter tubular portion 14 from the wire harness 12 being transferred directly to the increasing-diameter tubular portion 22. In addition, because the sound-proofing sealed chamber 48 is formed enclosed by the middle tubular portion 44, the small-diameter tubular portion 14, and the flexible connecting portion 34, noise from inside an engine compartment or the like can be absorbed by the sound-proofing sealed chamber 48, and the transmission of noise to a vehicle cabin can be reduced and blocked.

In the foregoing description, a plurality of embodiments of the present invention are described in detail. However, the present invention is not limited by the specific descriptions thereof. For example, the grommet 10 according to the embodiment described above has eight contact ribs 36 formed on the outer circumferential surface of the increasing-diameter tubular portion 22 at substantially equal intervals away from each other in the circumference direction, but the contact ribs 36 may also be provided at unequal intervals, and the number of contact ribs 36 may be any number that is two or greater. Also, in the embodiment described above, the shapes of the contact ribs 36 and the excavated holes 40 are described as substantially rectangular in a front view, but any shape can be adopted, such as a polygonal shape.

DESCRIPTION OF REFERENCE NUMERALS

10: Grommet, 12: wire harness, 14: small-diameter tubular portion, 16: vehicle body panel (fixed member), 18: through-hole, 20: large-diameter tubular portion, 22: increasing-diameter tubular portion, 32: small-diameter tubular portion-side end portion, 34: flexible connecting portion, 36: contact rib, 38: flared portion, 40: excavated hole

What is claimed is:

1. A grommet comprising:
   a small-diameter tubular portion configured to be fixed to an outer circumferential surface of a wire harness,
   a large-diameter tubular portion configured to be fixed to a through-hole of a fixed structure, and
   an increasing-diameter tubular portion that connects the small-diameter tubular portion and the large-diameter tubular portion,
   wherein the increasing-diameter tubular portion includes a small-diameter tubular portion-side end portion isolated from the small-diameter tubular portion on an outer circumference side of the small-diameter tubular portion, and a flexible connecting portion connecting an inner circumferential surface of the increasing-diameter tubular portion to the small-diameter tubular portion, and
   a plurality of contact ribs project from an outer circumferential surface of the increasing-diameter tubular portion, the contact ribs being arranged so as to be separated from each other in a circumference direction, each extending from the large-diameter tubular portion side toward the small-diameter tubular portion-side end portion, and the contact ribs provide the increasing-diameter tubular portion with a rigidity that prevents the increasing-diameter tubular portion from collapsing inward.

2. The grommet according to claim 1, wherein each contact rib extends right up to an end face of the small-diameter tubular portion-side end portion, and the contact ribs include a flared portion that flares outward in a diameter direction at the end face of the small-diameter tubular portion-side end portion.

3. The grommet according to claim 2, wherein a width-direction center portion of each contact rib includes an excavated hole that is open on an outer circumferential surface, and the excavated hole does not extend all the way to the flared portion.

4. The grommet according to claim 1, wherein a connecting position of the flexible connecting portion on the inner circumferential surface of the increasing-diameter tubular portion is closer to the large-diameter tubular portion than the small-diameter tubular portion-side end portion.

5. A grommet comprising:
   a small-diameter tubular portion configured to be fixed to an outer circumferential surface of a wire harness,
   a large-diameter tubular portion configured to be fixed to a through-hole of a fixed structure, and
   an increasing-diameter tubular portion that connects the small-diameter tubular portion and the large-diameter tubular portion,
   wherein the increasing-diameter tubular portion includes a small-diameter tubular portion-side end portion isolated from the small-diameter tubular portion on an outer circumference side of the small-diameter tubular portion, and a flexible connecting portion connecting an inner circumferential surface of the increasing-diameter tubular portion to the small-diameter tubular portion,
   a plurality of contact ribs project from an outer circumferential surface of the increasing-diameter tubular portion, the contact ribs being arranged so as to be separated from each other in a circumference direction, each extending from the large-diameter tubular portion side toward the small-diameter tubular portion-side end portion,
   each contact rib extends right up to an end face of the small-diameter tubular portion-side end portion, and the contact ribs include a flared portion that flares outward in a diameter direction at the end face of the small-diameter tubular portion-side end portion, and
   a width-direction center portion of each contact rib includes an excavated hole that is open on an outer circumferential surface, and the excavated hole does not extend all the way to the flared portion.

6. The grommet according to claim 5, wherein a connecting position of the flexible connecting portion on the inner circumferential surface of the increasing-diameter tubular portion is closer to the large-diameter tubular portion than the small-diameter tubular portion-side end portion.

* * * * *